United States Patent [19]

Miller, Jr.

[11] Patent Number: 5,346,369
[45] Date of Patent: Sep. 13, 1994

[54] BILGE PUMP ACTUATED BY WAVE MOTION

[76] Inventor: William L. Miller, Jr., 3067 SW. 45 St., Fort Lauderdale, Fla. 33312

[21] Appl. No.: 167,175

[22] Filed: Dec. 16, 1993

[51] Int. Cl.⁵ .................. B63B 13/00; F04B 17/00
[52] U.S. Cl. .................... 417/211; 417/328; 417/331; 417/473; 417/330; 114/183 A
[58] Field of Search ............. 417/328, 330, 331, 473, 417/211; 114/183 A

[56] References Cited

U.S. PATENT DOCUMENTS

| | | | |
|---|---|---|---|
| 279,452 | 6/1883 | Sinclair | 417/473 X |
| 2,019,023 | 10/1935 | Seilliere | 417/328 |
| 2,624,305 | 1/1953 | Herrick et al. | 417/211 X |
| 2,891,499 | 6/1959 | Skovranek . | |
| 2,969,761 | 1/1961 | Youtie . | |
| 3,040,671 | 6/1962 | Whitehurst . | |
| 3,319,820 | 5/1967 | Ward | 417/473 X |
| 3,598,505 | 8/1971 | Greene et al. | 417/330 |
| 3,771,920 | 11/1973 | Grant | 417/331 X |
| 4,242,053 | 12/1980 | Malvenna | 417/328 X |
| 4,289,455 | 9/1981 | Comyns-Cart et al. | 417/473 X |
| 4,449,894 | 5/1984 | Higc | 417/328 |
| 5,044,295 | 9/1991 | Shimokawa . | |

FOREIGN PATENT DOCUMENTS

| | | | |
|---|---|---|---|
| 2382596 | 11/1978 | France | 417/330 |
| 2185 | of 1874 | United Kingdom | 417/473 |

*Primary Examiner*—Richard E. Gluck
*Attorney, Agent, or Firm*—Rhodes and Ascolillo

[57] ABSTRACT

A pump actuated by a reciprocal oscillating motion, the pump including a casing member enclosing an elongated substantially cylindrical chamber therewithin, a pair of flexible bellows disposed at the opposing distal ends of the chamber, each of the bellows, in a normal unflexed state, extending inward into the chamber, and each of the bellows enclosing a pumping chamber, each of the pumping-chambers having a one way intake port and a one way output port, a piston positioned within the chamber for reciprocation therewithin under the influence of gravity in response to the reciprocal oscillating motion, the piston including a substantially spheroid member, the piston having a reciprocal stroke such that, at the extremes of the reciprocal stroke, the piston alternately compresses each of the flexible bellows, thereby alternately decreasing the volume of each of the pumping, and a cap member disposed at each of the distal ends of the casing member, each of the cap members abutting one of the flexible bellows to thereby enclose the pumping chambers between the cap members and the flexible bellows.

12 Claims, 3 Drawing Sheets

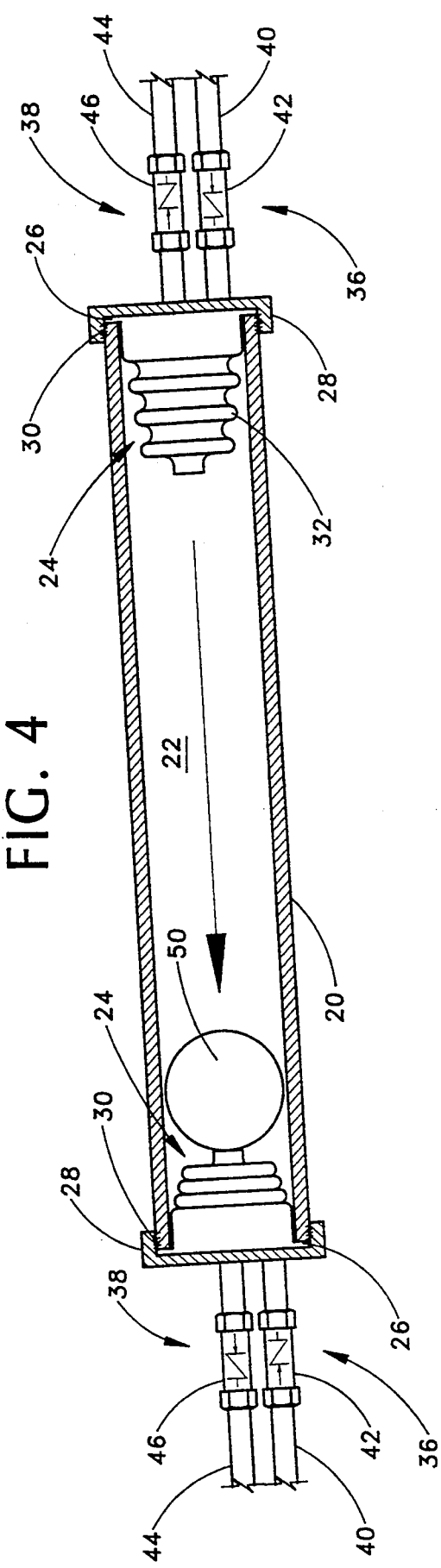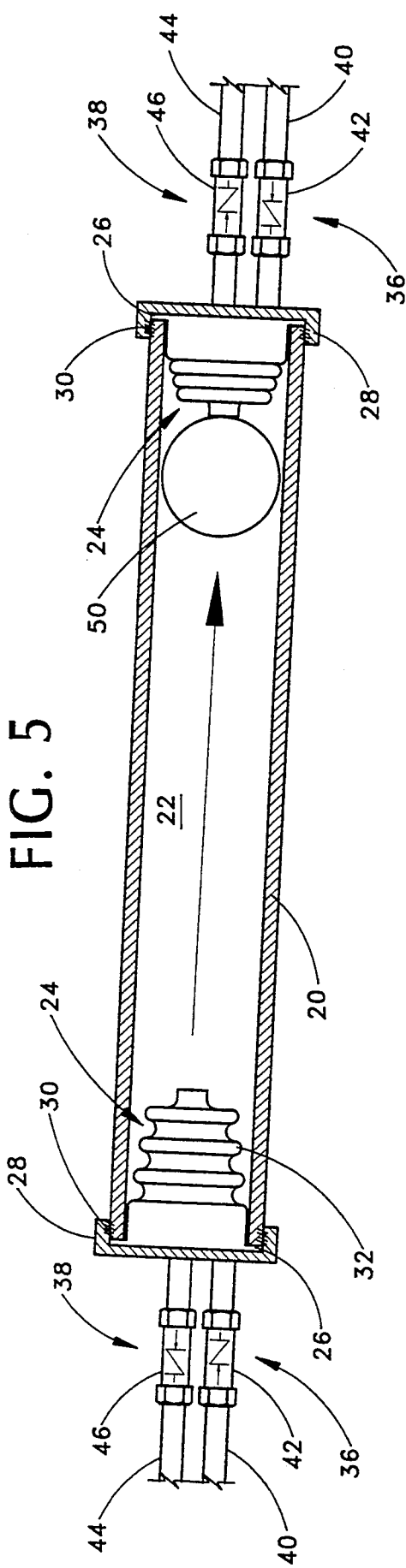

BILGE PUMP ACTUATED BY WAVE MOTION

BACKGROUND

1. Field of the Invention

The present invention relates in general to pumps, more particularly, to pumps that draw their power from the environment, and even more particularly, to bilge pumps that are employed to remove bilge water from water going vessels.

2. Description of the Related Art

U.S. Pat. No. 5,044,295 relates to an apparatus for removing water out of a boat that includes a swingable member actuated by a rolling or pitching motion of the boat, and a water discharging pump actuated by the swingable member.

U.S. Pat. No. 3,040,671 relates to a gravity actuated pump for a boat that includes a housing, at the base of which there is a pressure chamber having an entrance flutter valve, a flexible bellow, and an output ball and seat valve. A pressure head is connected to the bellow, the pressure head being constrained for reciprocal motion by a vertical guide within the housing, and being universally pivotally connected to a heavy weight, the weight, in turn, being universally pivotally connected to the housing.

U.S. Pat. No. 2,969,761 relates to a bilge pump for a vessel having a casing and a piston reciprocal therein adapted to be mounted for oscillating motion caused by the vessel, the casing having a single median inlet port for passing liquids only into the casing, and outlet ports at opposite ends of the casing for passing liquids only out of the casing and into conduits that communicate with the exterior of the vessel.

U.S. Pat. No. 2,891,499 relates to a pump which, when installed in a boat, is operated by the incessant intermittent pull of the boat on the mooring line to pump out any water that may be at the bottom of the boat.

U.S. Pat. No. 2,624,305 relates to a bailing pump for boats that includes a vertically upward projecting leaf spring having a weighted pendulum at the top thereof, the rocking of which actuates a bellows, the bellows connecting via a conduit to a T-shaped coupling member, one branch of the T-shaped connection leading to a one way intake port, and the other branch of the T-shaped connection leading to a discharge conduit.

SUMMARY OF THE INVENTION

Various devices have been proposed for pumping any water that finds its way into the hold of a vessel. Some employ electrically powered pumps, which can tax the electrical systems of large craft, and are clearly not feasible in small craft lacking electrical systems. Manually actuated pumps require significant effort to operate.

As noted above, a number of devices have been proposed that seek to utilize the natural rocking motion of large bodies of water to effect a pumping action. However, quite frequently, such devices are structurally complicated and are thus subject to mechanical failure.

Accordingly, one object of the present invention is the provision of a bilge pump that is actuated by the natural wave motion of bodies of water.

Another object of the invention is the provision of such a bilge pump that is operable to discharge water with each tilt of the vessel, be it to one side or the other.

Yet another object of the invention is the provision of such a bilge pump that is relatively simple in both design and operation, resulting in fewer mechanical failures and required maintenance, as well as in lower manufacturing costs.

In one aspect, the invention generally features a pump actuated by a reciprocal oscillating motion, the pump including: a casing member enclosing an elongated chamber therewithin; a pair of flexible bellows disposed at the opposing distal ends of the chamber, each of the bellows, in a normal unflexed state, extending inward into the chamber, and each of the bellows enclosing a pumping chamber; each of the pumping chambers having a one way intake port and a one way output port; and a piston positioned within the chamber for reciprocation therewithin under the influence of gravity in response to the reciprocal oscillating motion; the piston having a reciprocal stroke such that, at the extremes of the reciprocal stroke, the piston alternately compresses each of the flexible bellows, thereby alternately decreasing the volume of each of the pumping chambers.

Preferably, the elongated chamber is a substantially cylindrical chamber, and the piston is a substantially spheroid member.

In another aspect, the invention generally features a pump actuated by a reciprocal oscillating motion, the pump including: a casing member enclosing an elongated substantially cylindrical chamber therewithin; a pair of flexible bellows disposed at the opposing distal ends of the chamber, each of the bellows, in a normal unflexed state, extending inward into the chamber, and each of the bellows enclosing a pumping chamber; each of the pumping chambers having a one way intake port and a one way output port; a piston positioned within the chamber for reciprocation therewithin under the influence of gravity in response to the reciprocal oscillating motion; the piston including a substantially spheroid member; the piston having a reciprocal stroke such that, at the extremes of the reciprocal stroke, the piston alternately compresses each of the flexible bellows, thereby alternately decreasing the volume of each of the pumping chambers; and a cap member disposed at each of the distal ends of the casing member, each of the cap members abutting one of the flexible bellows to thereby enclose the pumping chambers between the cap members and the flexible bellows.

Preferably, the pump additionally includes first and second conduits extending from each of the pumping chambers, the one way intake port being disposed in the first conduit, and the one way output port being disposed in the second conduit; each of the flexible bellows includes a substantially convexly shaped member having a plurality of radially outstanding ridges protruding therefrom; each of the flexible bellows additionally includes a substantially conically shaped member including an elastomeric material; each of the one way intake port and the one way output port includes a one way check valve; and each of the pair of flexible bellows additionally includes an annular flange projecting radially outward from the base of the conically shaped member, each of the annular flanges being disposed between one of the distal ends of the casing member and one of the cap members.

In yet another aspect, the invention generally features a pump actuated by a reciprocal oscillating motion, the pump including: a substantially cylindrically shaped casing member enclosing an elongated substantially cylindrical chamber therewithin; a pair of flexible bellows disposed at the opposing distal ends of the chamber, each of the bellows, in a normal unflexed state, extending inward into the chamber, and each of the bellows enclosing a pumping chamber; each of the flexible bellows including a substantially conically shaped member including an elastomeric material and having a plurality of radially outstanding ridges protruding therefrom; each of the pumping chambers having a one way intake port and a one way output port; each of the one way intake port and the one way output port including a one way check valve; a piston positioned within the chamber for reciprocation therewithin under the influence of gravity in response to the reciprocal oscillating motion; the piston including a substantially spheroid member; the piston having a reciprocal stroke such that, at the extremes of the reciprocal stroke, the piston alternately compresses each of the flexible bellows, thereby alternately decreasing the volume of each of the pumping chambers; a cap member disposed at each of the distal ends of the casing member, each of the cap members abutting one of the flexible bellows to thereby enclose the pumping chambers between the cap members and the flexible bellows; and first and second conduits extending from each of the pumping chambers, the one way intake-port being disposed in the first conduit, and the one way output port being disposed in the second conduit.

Preferably, the diameter of the substantially cylindrical chamber is substantially equal to about four inches; the weight of the substantially spheroid member is substantially equal to about eight pounds; the elastomeric material includes neoprene; and the pump additionally includes a filter mechanism provided on each of the first conduits for filtering fluid entering the first conduits.

The invention will now be described by way of a particularly preferred embodiment, reference being made to the accompanying drawings, wherein:

BRIEF DESCRIPTION OF THE DRAWINGS

FIG. 4 is a cross sectional front elevational view of the inventive bilge pump, showing the pump being actuated by a leftward tilt of the vessel; and FIG. 5 is a cross sectional front elevational view of the inventive bilge pump, showing the pump being actuated by a rightward tilt of the vessel.

DESCRIPTION OF THE PREFERRED EMBODIMENT

Figure 1:
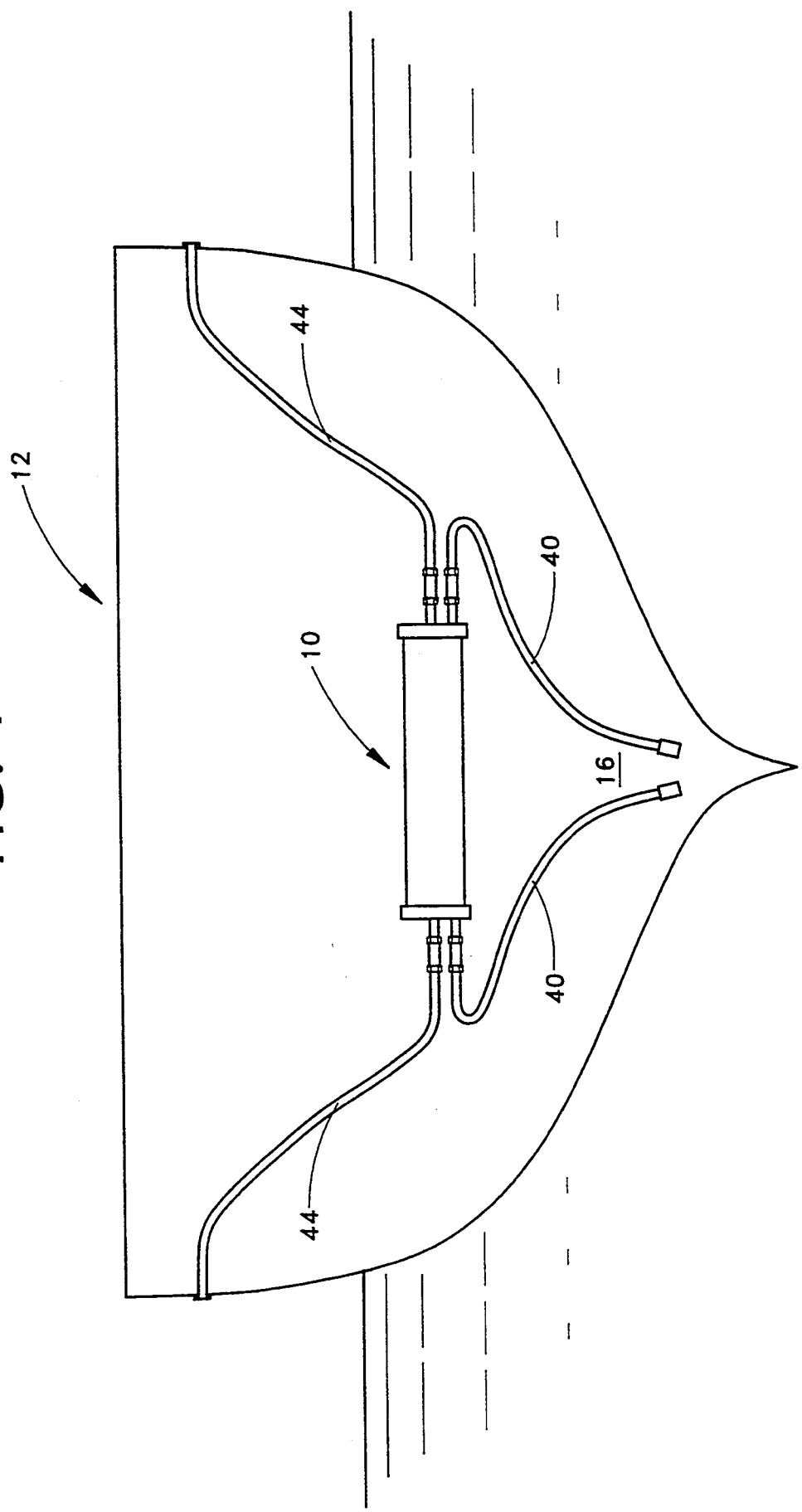
FIG. 1 is an illustration of a water going vessel, showing a bilge pump constructed according to the present invention installed therein.
Figure 2:
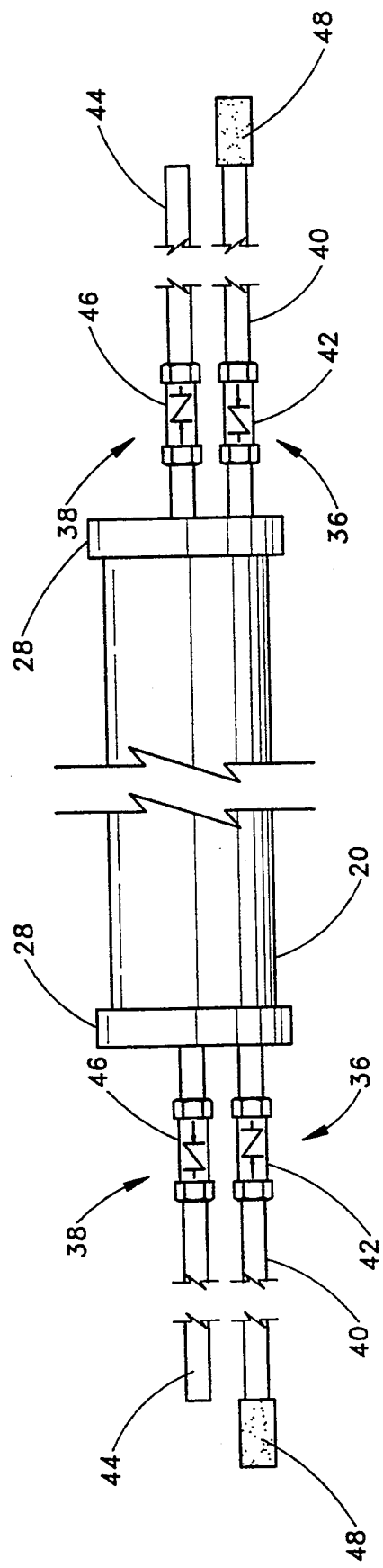
FIG. 2 is a front elevational view of the inventive bilge pump.
Figure 3:
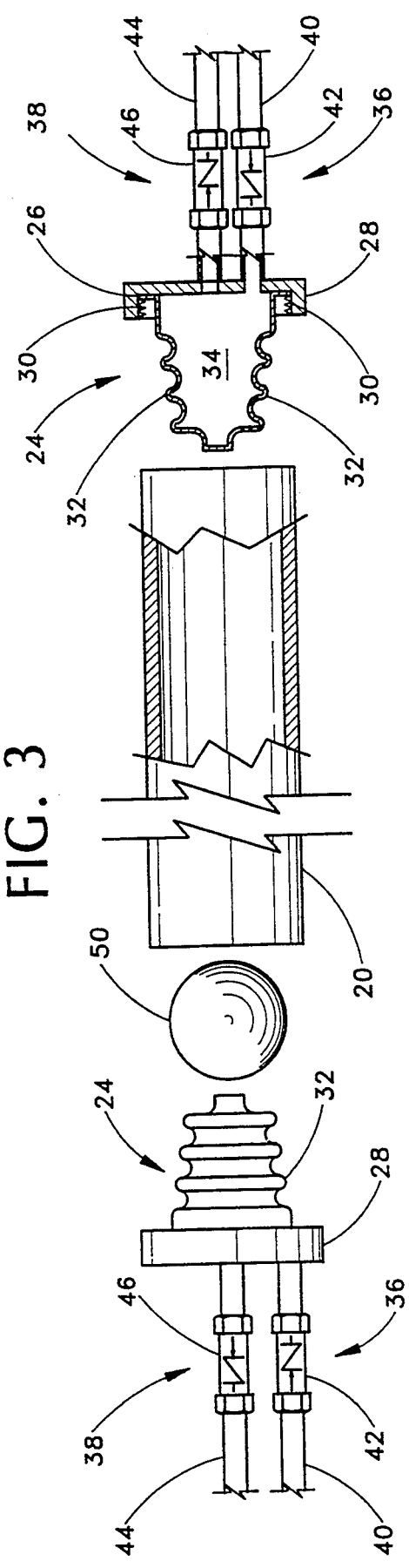
FIG. 3 is an exploded front elevational view of the inventive bilge pump.

As illustrated in FIG. 1, a bilge pump 10 constructed according to the present invention is dimensioned and constructed to be positioned transversely across the longitudinal axis of a water craft 12. The bilge pump 10 is provided with a pair of intake conduits 40 that extend into the bilge 16 of the water craft 12 and a pair of output conduits 44 that terminate outside of the water craft 12. With the bilge pump 10 positioned transversely across the water craft 12, as shown in FIG. 1, any wave action such as is normally produced by a large body of water will impart a reciprocal oscillating motion to the bilge pump 10 that will, as is more fully discussed below, cause the bilge pump 10 to produce a pumping action that will forcibly pump water from the bilge 16 and through the intake and output conduits 40 and 44, respectively, to the exterior of the water craft 12.

Referring now most particularly to FIGS. 2–5, the inventive bilge pump 10 generally includes a casing member 20 that is preferably cylindrically shaped and that encloses an elongated chamber 22 therewithin, the chamber 22 also being preferably of cylindrical shape. One each of a pair of flexible bellows 24 is provided at each of the distal ends of the chamber 22. The flexible bellows 24 are preferably mounted at the distal ends of the chamber 22 by the provision of an outstanding annular flange 26 that extends outward from the base of each of the flexible bellows 24. The annular flanges 26 of the flexible bellows 24 are gripped between the distal ends of the casing member 20 and a pair of end cap members 28 that threadingly engage the distal ends of the casing member 20 via provided threads 30. The flexible bellows 24, in their normal unflexed state, extend convexly inward into the chamber 22, are preferably substantially conically shaped, and have a number of radially outstanding annular ridges 32 provided thereon which provide rigidity and cause the flexible bellows 24, when compressed, to collapse in an axial direction.

Each of the flexible bellows 24 encloses a pumping chamber 34 therein, each of the pumping chambers 34 also being defined, in part, by the end cap members 28 which the flexible bellows 24 abut. Each of the pumping chambers 34 communicates with a one way intake port 36 and a one way output port 38. Preferably, each of the one way intake ports 36 includes the first conduit 40 that communicates with the pumping chamber 34 through the end cap member 28, the first conduit 40 having a first one way check valve 42 disposed along its length that passes fluid only in the direction toward the pumping chamber 34. Additionally, each of the one way output ports 38 includes the second conduit 44 that also communicates with the pumping chamber 23 through the end cap member 28, the second conduit 44 having a second one way check valve 46 disposed along its length that passes fluid only in the direction away from the pumping chamber 34. Moreover, each of the distal ends of the first conduits 40 is provided with an intake filter 48 for preventing the entry of dirt, etc.

A piston 50 is disposed within the elongated chamber 22 for reciprocation therewithin under the influence of gravity in response to any reciprocal oscillating motion caused by wave motion or the like. Preferably, the piston 50 is a substantially spheroid member that can roll or otherwise reciprocate within the elongated chamber 22. As is illustrated most clearly in FIGS. 4 and 5, in response to a tilting motion of the casing member 20 in either direction, the piston 50 will come in contact with and, due to its weight, compress one of the flexible bellows 24, thereby compressing the respective pumping chamber 34 and forcing any fluid within the respective pumping chamber 34 out through the respective one way output port 38. When the casing member 20 is thereafter tilted in the opposite direction, the previously compressed flexible bellow 24 expands to its normal unflexed state, causing a corresponding expansion of the respective pumping chamber 34, and thereby drawing fluid into the pumping chamber 34 through the respective one way intake port 36. For example, in FIG. 4, a counterclockwise tilting of the casing member 20 has caused the piston to contact and compress the left flexible bellows 24. A subsequent clockwise tilting of the casing member 20, as shown in FIG. 5, causes the piston to release the left flexible bellows 24, which, having a substantial "memory," returns to its normal unflexed state and thereby draws fluid into the respective pumping chamber 34 through the respective one way intake port 36. When the casing member 20 is subsequently again tilted in a counterclockwise direction and returns to the orientation shown in FIG. 4, this fluid will then be expelled through the respective one way output port 38. It will thus be seen that the piston 50 shuttles back and forth between the two flexible bellows 24 effecting alternative pumping actions with each such motion.

In order to produce a sufficient vacuum for the intake of fluid through the one way intake ports 36, the flexible bellows 24 should have sufficient internal bias (or "memory") to cause them to return to their unflexed state. The present inventor has achieved good results by constructing the flexible bellows 24 from neoprene, by constructing the elongated chamber 22 to be substantially cylindrical and on the order of four inches in diameter, and by constructing the piston 50 to be substantially spheroid shaped and on the order of eight pounds in weight.

In order to prevent corrosion, the piston 50 is preferably constructed from, or at least coated with, a corrosion resistant substance. Preferably, the piston 50 has a iron core that is 3½ inches in diameter and which is covered with a brass shell on the order of ¼ inch thick. The present inventor has achieved good results by using the so-called "boot covers" for constant velocity joints in motor vehicles for the bellows 24, the boot covers providing sufficient resilience to generate a substantial pumping action.

Other embodiments are possible. For example, the "memory," and therefore the pumping action, of the flexible bellows 24 can be increased by the provision of a coil spring positioned within each of the pumping chambers 34, which would provide additional bias to urge each of the flexible bellows 24 back to its unflexed state.

While the invention has been herein described by way of a particular preferred embodiment, various substitutions of equivalents may be effected without departing from the spirit and scope of the invention as set forth in the following claims.

What is claimed is:

1. A pump actuated by reciprocal oscillating motion, said pump comprising:
   a casing member enclosing an elongated chamber therewithin;
   a pair of flexible bellows disposed at the opposing distal ends of said chamber, each of said bellows, in a normal unflexed state, extending inward into said chamber, and each of said bellows enclosing a pumping chamber;
   each of said pumping chambers having a one way intake port and a one way output port; and
   a piston positioned within said chamber for reciprocation therewithin under the influence of gravity in response to the reciprocal oscillating motion;
   said piston having a reciprocal stroke such that, at the extremes of said reciprocal stroke, said piston alternately compresses each of said flexible bellows, thereby alternately decreasing the volume of each of said pumping chambers;
   said elongated chamber comprising a substantially cylindrical chamber, and said piston comprising a substantially spheroid member.

2. A pump actuated by a reciprocal oscillating motion, said pump comprising:
   a casing member enclosing an elongated substantially cylindrical chamber therewithin;
   a pair of flexible bellows disposed at the opposing distal ends of said chamber, each of said bellows, in a normal unflexed state, extending inward into said chamber, and each of said bellows enclosing a pumping chamber;
   each of said pumping chambers having a one way intake port and a one way output port;
   a piston positioned within said chamber for reciprocation therewithin under the influence of gravity in response to the reciprocal oscillating motion;
   said piston comprising a substantially spheroid member;
   said piston having a reciprocal stroke such that, at the extremes of said reciprocal stroke, said piston alternately compresses each of said flexible bellows, thereby alternately decreasing the volume of each of said pumping chambers; and
   a cap member disposed at each of said distal ends of said casing member, each of said cap members abutting one of said flexible bellows to thereby enclose said pumping chambers between said cap members and said flexible bellows.

3. A pump according to claim 2, wherein said pump additionally comprises first and second conduits extending from each of said pumping chambers, said one way intake port being disposed in said first conduit, and said one way output port being disposed in said second conduit.

4. A pump according to claim 3, wherein each of said flexible bellows comprises a substantially convexly shaped member having a plurality of radially outstanding ridges protruding therefrom.

5. A pump according to claim 4, wherein each of said flexible bellows additionally comprises a substantially conically shaped member comprising an elastomeric material.

6. A pump according to claim 5, wherein each of said one way intake port and said one way output port comprises a one way check valve.

7. A pump according to claim 6, wherein each of said pair of flexible bellows additionally comprises an annular flange projecting radially outward from the base of said conically shaped member, each of said annular flanges being disposed between one of said distal ends of said casing member and one of said cap members.

8. A pump actuated by a reciprocal oscillating motion, said pump comprising:
   a substantially cylindrically shaped casing member enclosing an elongated substantially cylindrical chamber therewithin;
   a pair of flexible bellows disposed at the opposing distal ends of said chamber, each of said bellows in a normal unflexed state, extending inward into said chamber, and each of said bellows enclosing a pumping chamber;
   each of said flexible bellows comprising a substantially conically shaped member comprising an elastomeric material and having a plurality of radially outstanding ridges protruding therefrom;
   each of said pumping chambers having a one way intake port and a one way output port;
   each of said one way intake port and said one way output port comprising a one way check valve;

a piston positioned within said substantially cylindrical chamber for reciprocation therewithin under the influence of gravity in response to the reciprocal oscillating motion;

said piston comprising a substantially spheroid member;

said piston having a reciprocal stroke such that, at the extremes of said reciprocal stroke, said piston alternately compresses each of said flexible bellows thereby alternately decreasing the volume of each of said pumping chambers;

a cap member disposed at each of said distal ends of said casing member, each of said cap members abutting one of said flexible bellows to thereby enclose said pumping chambers between said cap members and said flexible bellows; and first and second conduits extending from each of said pumping chambers, said one way intake port being disposed in said first conduit, and said one way output port being disposed in said second conduit.

9. A pump according to claim 8, wherein the diameter of said substantially cylindrical chamber is substantially equal to about four inches.

10. A pump according to claim 9, wherein the weight of said substantially spheroid member is substantially equal to about eight pounds.

11. A pump according to claim 10, wherein said elastomeric material comprises neoprene.

12. A pump according to claim 11, said pump additionally comprising filter means provided on each of said first conduits for filtering fluid entering said first conduits.

* * * * *